(12) United States Patent
Sanchez et al.

(10) Patent No.: US 9,731,284 B1
(45) Date of Patent: Aug. 15, 2017

(54) PROCESS FOR OXIDATION OF AMINES IN THE SYNTHESIS OF ENERGETIC MATERIALS

(71) Applicant: The United States of America as Represented by the Secretary of the Army, Washington, DC (US)

(72) Inventors: Peggy A. Sanchez, Sparta, NJ (US); Kimberly Griswold, Flanders, NJ (US); Sergiu M. Gorun, Montclair, NJ (US); Hemantbhai H. Patel, Piscataway, NJ (US)

(73) Assignees: The United States of America as Represented by the Secretary of the Army, Washington, DC (US); Seton Hall University, South Dramse, NJ (US)

( * ) Notice: Subject to any disclaimer, the term of this patent is extended or adjusted under 35 U.S.C. 154(b) by 0 days.

(21) Appl. No.: 15/051,884

(22) Filed: Feb. 24, 2016

Related U.S. Application Data

(63) Continuation-in-part of application No. 14/222,987, filed on Mar. 24, 2014, now abandoned.

(60) Provisional application No. 62/134,748, filed on Mar. 18, 2015.

(51) Int. Cl.
| | |
|---|---|
| *B01J 21/00* | (2006.01) |
| *B01J 23/00* | (2006.01) |
| *B01J 25/00* | (2006.01) |
| *B01J 29/00* | (2006.01) |
| *B01J 31/38* | (2006.01) |
| *B01J 31/18* | (2006.01) |

(52) U.S. Cl.
CPC ............ *B01J 31/38* (2013.01); *B01J 31/183* (2013.01); *B01J 2231/70* (2013.01); *B01J 2531/26* (2013.01)

(58) Field of Classification Search
USPC ........................................ 502/100, 150, 154
See application file for complete search history.

(56) References Cited

U.S. PATENT DOCUMENTS

| | | | | |
|---|---|---|---|---|
| 2012/0283430 | A1* | 11/2012 | Gorun ................ | C09B 47/0671 540/137 |
| 2013/0064712 | A1* | 3/2013 | Roder ................ | A61K 31/409 422/29 |
| 2015/0284592 | A1* | 10/2015 | Gorun ................ | B01J 37/0225 524/88 |

OTHER PUBLICATIONS

Nardello, Veronique, et al., Facile preparation of the water-soluble singlet oxygen traps anthracene-9,10-divinylsulfonate (AVS) and anthracene-9,10-diethylsulfonate (AES) via a Heck reaction with vinylsulfonate, Snynett, 2005, 2667-2669, 15, George Thiene Verlag Stuttgart, New York.

(Continued)

*Primary Examiner* — James McDonough
(74) *Attorney, Agent, or Firm* — Lisa H. Wang

(57) ABSTRACT

A process for use of composite catalysts for oxidation of amines during synthesis of energetic compounds. This method overcomes the safety concerns associated with dangerous reaction conditions for these energetic materials. The process requires exposing phthalocyanine conjugated to an inorganic substrate to the precursor reactant and activating the composite material to light and oxygen to covert amine groups into oxidized nitrogen species.

14 Claims, 4 Drawing Sheets

(56) References Cited

OTHER PUBLICATIONS

Nui, Q.J., Singlet molecular oxygen generation from the decomposition of sodium peroxotungstate and sodium peroxomolybdate, Inorgan. Chem., 1992, 3472-3476, 31, American Chemical Society.

* cited by examiner

Si-Imi-F₆₄PcZn 1-methyl-3,5-diamino-1H-1,2,4-triazole
DAMT 3,4-diaminofurazan
DAF 3,4-bis(aminofurazano)furoxan
BAFF

PROCESS FOR OXIDATION OF AMINES IN THE SYNTHESIS OF ENERGETIC MATERIALS

CROSS REFERENCE TO RELATED APPLICATIONS

The present application is a continuation-in-part application that claims the benefit of non-provisional application entitled "Fluorinated Phthalocyanine-Solid State Support Composites" filed on Mar. 24, 2014 as Ser. No. 14/222,987 and the provisional patent application entitled "Fluorophthalocynanine Catalyzed Singlet Oxygen Generation for Continuous Oxidative Synthesis" filed on Mar. 18, 2015, as Ser. No. 62/134,748, the disclosures of which are incorporated in its entirety herein.

RIGHTS OF THE GOVERNMENT

The inventions described herein may be manufactured and used by or for the United States Government for government purposes without payment of any royalties.

FIELD OF INVENTION

The invention relates to use of composite catalysts comprising phthalocyanine conjugated to a solid-state support for oxidation of amines into oxidized nitrogen species during synthesis of energetic compounds.

BACKGROUND OF THE INVENTION

High energy density materials (HEDMs) are a new class of energetic materials that exhibit a high energy density. Their explosive power, derived from high heats of formation obtained from breaking stable C—N and N=N bonds during combustion or detonation, allows for the use of smaller quantities of explosives to achieve the same energy output as current energetics. Of importance are new melt-cast compounds that are being developed as an alternative to TNT (2,4,6-trinitrotoluene) or Composition B (consisting of castable mixtures of RDX-1,3,5-trinitroperhydro-1,3,5-triazine and TNT). Many of these new melt cast candidates are high density aromatic heterocycles containing nitro and nitroso moieties that are oxidized in the final step of synthesis from their corresponding amines.

Current procedures for making HEDM has long been a concern in energetic synthetic chemistry because of dangerous reaction conditions. Procedures to oxidize inert starting materials with primary amines typically require concentrated peroxides, acids and large amounts of transition metals. For instance, 1-methyl-3,5-diamino-1H-1,2,4-triazole is nitrated under acidic conditions using concentrated $H_2SO_4$ and $NaNO_2$ to form 1-methyl-3,5-dinitro-1H-1,2,4-triazole (MDNT). 3,4-Bis(3-nitrofurazan-4-yl)furoxan (BNFF aka DNTF) is nitrated from the corresponding diamine compound using 96% $H_2SO_4$. In addition to the corrosive properties, dangerous handling and disposal of the acidic chemicals, these nitration reactions exhibit powerful exotherms that are difficult to control and prevent any scale-up efforts due to safety concerns. Thus, a need exists for compounds that can aid in a safer oxidation of amine groups during synthesis of energetic compounds.

Catalysts are a class of compounds that accelerates chemical reactions, without itself undergoing a permanent chemical change by lowering the activation energy of the reaction. They may be characterized as either exhaustive or reusable. Exhaustive reactions also referred to as stoichiometric reactions require a continuous or excess supply of catalysts as the catalyst is consumed as part of the reaction. Rose Bengal is an example of such a catalyst.

In contrast, renewable catalysts can be reused or regenerated during a reaction but may require higher activation energy to complete a reaction.

Catalysts are also categorized by their phasic compatibility with the reaction agents. Those catalysts that are in the same phase as the reactants are deemed homogenous catalysts while those in a different phase are heterogeneous. Homogenous catalysts, intimately mixed with the reactants, will generally provide higher chemical activity via lower effective activation energies. This may create a problem with separating such potentially useful materials from the desired products into which they are mixed or leaching of the catalyst metal center in the solvent environment. Leaching of the metal center presents substantial difficulty in isolating the dissolved metal catalyst or generate harmful undesired secondary products that may occur from use. As an example use of sodium tungstate in stoichiometric quantities when synthesizing BNFF results in great difficulty isolating leached catalyst from the desired product.

Heterogeneous catalysts, however, will generally not exhibit such high activity (activation energies), but it can easily be separated from the reactants, oftentimes by simple physical filtration. However depending on the reaction heterogeneity does not always guarantee resolution to leaching of the metal. Chemical modification of the metal center may prevent leaching in either homogeneous or heterogeneous physical states.

Hybrid catalysts are therefore created to capture the high catalytic activity of homogenous catalysts but also the separation ease of a homogenous catalyst. Some prior art composites solve this problem by coupling the catalysts to solid state supports such as metal oxides, for example titanium oxides. These hybrid metal oxide catalysts, however, when activated by light creates reactive oxygen species which indiscriminately attack C—H bonds leading to self-deactivation.

Thus, a need arises for catalytic materials that can catalyze oxidation of amines in energetic synthesis, having high catalytic activity that can be readily isolated from a solution, reduces or eliminates leaching into relevant environment, and not self-decompose.

SUMMARY OF THE INVENTION

It is an object of the invention to provide a safe process for oxidizing amine groups in precursor energetic compounds by using composite catalysts for the production of singlet oxygen species wherein such catalysts can be easily isolated from the desired product.

The oxidation process described herein subjects a solution containing the composite catalyst and precursor energetic material to photocatalytic conditions such as light and oxygen.

The composite catalysts described herein comprises a solid-state material in bonding contact with $F_xPcM$, wherein F is fluorine, Pc is phthalocyanine, M is a metal or non-metal covalently bonded to Pc and x is a number greater than zero.

The composite catalysts described herein may further comprise an axial ligand wherein such axial ligand connects the M on $F_xPcM$ with the solid-state material.

The energetic precursor compound contemplated for oxidation is 3,4-diaminofurazan (DAF), 3,4-bis(aminofurazano)furoxan (BAFF), and 1-methyl-3,5-diamino-1H-1,2,4-triazole (DAMT).

BRIEF DESCRIPTION OF THE DRAWINGS

The invention will be better understood, and further objects, features and advantages thereof will become more apparent from the following description of the preferred embodiments, taken in conjunction with the accompanying drawings.

DETAILED DESCRIPTION

The present invention utilizes inorganic-organic composite materials as heterogeneous catalysts to oxidize amine groups into nitro groups in energetic precursor materials without the need for concentrated acids. The nitrogen oxidation process disclosed herein can be used with "green" mediums such as water or organic solvents. The catalysts disclosed in this process identified as perfluoroalkyl fluoro phthalocyanine (FPc) releases Reactive Oxygen Species (ROS) such as singlet oxygen under illumination with white light in the presence of oxygen is stable and non-toxic. The heterogeneous catalyst of the present invention has the further benefit of being regenerative thereby reducing waste without loss of efficiency.

The composite catalyst disclosed herein consists of an inorganic group and an organic group. An optional axial ligand connects the inorganic group to the organic group. For ease of reference the composite catalyst is written as "[inorganic group]-[organic group]" or "[inorganic group]-[axial ligand]-[organic group]". The composite catalysts as described immediately above may also include additional organic or inorganic groups.

Figure 1:
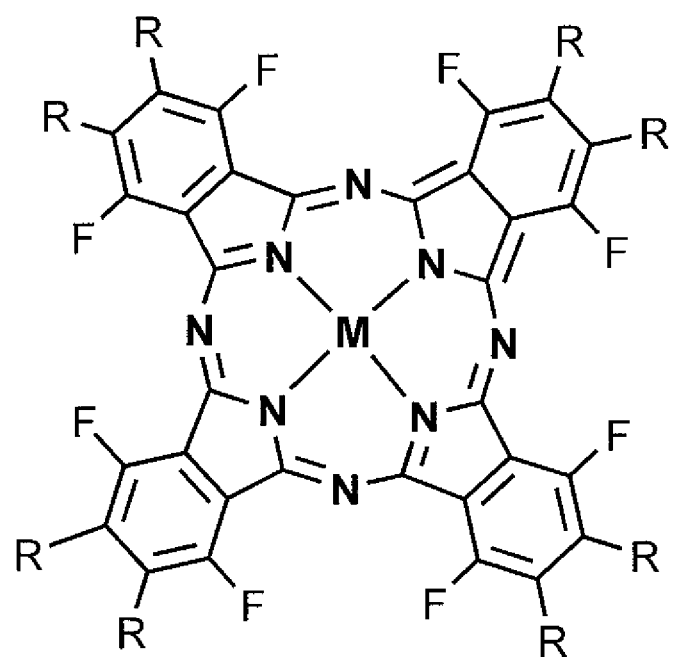
FIG. 1 is a chemical representation of the general structural formula of substituted fluoro phthalocyanines useful in the present invention.

The organic group is comprised of a single perfluoroalkyl fluoro phthalocyanine (FPc), or mixtures thereof, which is represented by the formula, $F_xPcM$. Pc represents phthalocyanine and F represents fluorine. A representative structure is illustrated in FIG. 1. The R groups in FIG. 1 represents particular perfluoroalkyl groups. Examples of R groups include perfluoroalkyl fluoro-phthalocyanine compounds such as perfluoroisopropyl, perfluoropentyl, perfluorohexyl, perfluorooctyl, and isomers and/or combinations thereof. Moreover, the aforementioned perfluoroalkyl groups may contain additional groups, for example, fluorinated aromatic molecules. Perfluoroalkyl groups comprising 3 carbon atoms are particularly effective for covalently bonding to the periphery of metallo fluoro-phthalocyanines according to the present disclosure. An exemplary perfluoroalkyl group with 3 carbon atoms that may be incorporated as part of the disclosed catalytic compound is perfluoro isopropyl.

M is a central metal with an ionic radii that can be coordinated by the four nitrogen atoms of the phthalocyanine (Pc). Examples of such metals include Zn, Co, Fe, Mg, Cu, and the like. The letter M also represents a non-metal constituent such as Si, P, or even a hydrogen ion.

A preferred organic group as used herein is $F_{64}$PcZn.

The inorganic component of the composite catalyst is comprised of a solid-state material that is in bonding contact with the organic FPcM as a support. Particular solid-state materials useful as supports in the present invention, include—(1) metal oxides, generally conforming to the chemical formulation of $M_xO_y$; (2) water insoluble salts, such as metal sulfides, carbonates, sulfates, halogenates, silicates, phosphates, chromates, and hydroxides; (3) inert complex materials, such as charcoal, clays minerals, zeolites, carbon clusters, and the like; and (4) mixtures of such metal oxides, water insoluble salts, and/or inert complex materials. Detailed explanations of the solid state materials follow below.

The metal oxides conforming to the chemical formulation of $M_xO_y$, include those wherein: M=Zn, Cu, Mg, Si, Ti, Al, Zr and similar atoms; while x and y are stoichiometric coefficients needed to generally render the particular material electrically neutral. Particularly useful oxides exhibiting such general charge neutrality, may include M=Al and x=2 and y=3; and, M being Si, Ti, or Zr and x=1 and y=2; and M being Zn, Cu, or Mg and x=1 and y=1. Preferred metal oxides include $SiO_2$ and $TiO_2$.

The general formula for the oxides and salts useful in the present invention is $(Cation)_m(Anion)_n$, wherein the "m" and "n" are integers, and the overall charge of the oxide or salt is zero. Useful examples include metal salts with anions belonging to (i) group 7 of the Periodic Table, for example halogen ions, their oxo-anions, and the like; (ii) group 6 of the Periodic Table, for example sulfates, sulfites, sulfides, sulfonates, and the like; (iii) group 5 of the Periodic Table, for example nitrates, nitrites, phosphates, and the like; (iv) group 4 of the Periodic Table, for example carbonates, silicates, and the like; (v) group 3 of the Periodic Table, for example borates, aluminates, and the like. Further, other useful examples included are combination of metals and anions, i.e. mixed salts.

In selecting a solid-state supporting material for FPcM, it must not be soluble in the organic solutions used in the manufacture of the subject hybrid materials or soluble in the aqueous solutions in which the composite materials are used. Therefore, any particular salts, or oxides, or inert complexes useful as solid-state supports cannot be soluble— in either certain organic or aqueous mixtures. For example, the solubility constant, $K_{sp}$, for the particular salts useful in the present invention must be small, i.e. such that the salt does not significantly ionize in the subject solvents. Particularly useful insoluble salts and their respective $K_{sp}$ in water include: AgBr—$5\times10^{-13}$; $BaCO_3$—$2\times10^{-9}$; $CaCO_3$—$5\times10^{-9}$; $Hg_2Cl_2$—$1\times10^{-18}$; $PbCl_2$—$1.7\times10^{-5}$; $Ag_2CrO_4$—$2\times10^{-12}$; $BaCrO_4$—$2\times10^{-10}$, $PbCrO_4$—$1\times10^{-16}$, $BaF_2$—$2\times10^{-6}$; $CaF_2$—$2\times10^{-10}$, $PbF_2$—$4\times10^{-8}$, $Al(OH)_3$—$5\times10^{-33}$, $Cr(OH)_3$—$4\times10^{38}$, $Fe(OH)_2$—$1\times10^{-15}$, $Fe(OH)_3$—$5\times10^{-38}$, $Mg(OH)_2$—$1\times10^{-11}$, $Zn(OH)_2$—$5\times10^{-17}$, $PbSO_4$—$1\times10^{-8}$, CdS—$1\times10^{-26}$, CoS—$1\times10^{-20}$, CuS—$1\times10^{-35}$, FeS—$1\times10^{-17}$, HgS—$1\times10^{-52}$, MnS—$1\times10^{-15}$, ZnS—$1\times10^{-20}$.

In addition to the above, some salts may contain a neutral molecule, such as those that can solvate the cations, for example, ammonia, $NH_3$, and it should be understood that such solvates are included in the above definition of useful "cation" or "anion" materials in the present invention as solid-state supports. And, furthermore, neutral molecules or materials composed of atoms can be used as supports—for example the above detailed inert complex materials—such as charcoal, graphite, carbon clusters, and/or metal particles. Moreover, useful materials include those that exhibit internal voids—for example, zeolites or clays—voids that, when contacted with the subject organic FPc materials, could be filled by them partially or fully. And, as a result, the FPc material will be trapped in an environment that brings in close proximity the substrate and the catalysts and thus induces the desired catalytic specificity properties to the overall hybrid composition.

The composite catalyst, inorganic group-organic group, may further comprise an axial ligand that is neutral or charged and positioned with respect to the central M atom of the $F_xPcM$. It may be a single ligand or combinations of axial ligands. The presence of an axial ligand coupled to the $F_xPcM$ component is preferred as it prevents the degradation or bleaching of the metal oxide from the $F_xPcM$ conjugate. Axial ligands contemplated for use with the composite catalyst include azoles and diazine. A preferred axial ligand is imidazole (Imi).

Figure 2:
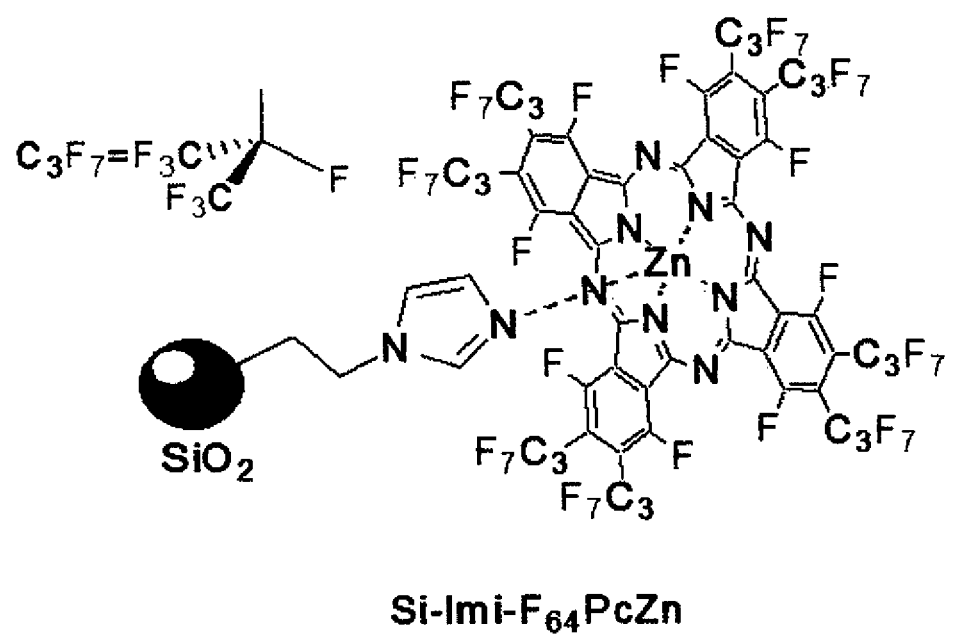
FIG. 2 is a schematic representation of a composite catalyst of the present inventive phthalocyanine and solid-state support with axial ligand.

The structure of an example composite catalyst is illustrated in FIG. 2 for $SiO_2$-Imi-$F_{64}PcZn$. The composite catalysts described herein can be easily filtered from the reaction solution for immediate reuse.

The following non-limiting examples illustrate embodiments of the disclosed invention.

Example 1

Synthesis of $TiO_2$—$F_{64}PcZn$ and $SiO_2$—$F_{64}PcZn$

Degussa P25 $TiO_2$ of size ~50 nm, or 10-20 nm silica gel nano powder were used to prepare $TiO_2$/fluorophthalocyanine or $SiO_2$/fluorophthalocyanine composite catalysts. $TiO_2$ or $SiO_2$ particles were heat treated at 100° C. for 2 h to remove any adsorbed moisture. The fluorophthalocyanine was dissolved in ethanol to which solid $TiO_2$ or $SiO_2$ particles were added. The mixture was roto-evaporated to obtain $TiO_2$—$F_{64}PcZn$ and $SiO_2$—$F_{64}PcZn$ which were next dried at 100° C. for 12 h before being used for further studies.

Synthesis of $AVS.4H_2O$

AVS is a water soluble indicator of singlet oxygen and synthesized as per Nardello et al. which is incorporated herein in its entirety. A mixture of 9,10-dibromoanthracene (2.945 g, 8.76 mmol), sodium acetate (1.760 g, 21.46 mmol), and trans-di(μ-acetato)-bis[o-(di-o-tolylphosphino)benzyl]dipalladium(II) (0.081 g, 0.09 mmol), dissolved in a mixed solvent system consisting of dimethyl formamide (33.0 mL) and n-methyl-2-pyrrolidone (33.0 mL) was heated at 100° C. until a clear solution was obtained. A 25% aqueous solution of sodium vinyl sulfonate (11.0 mL, 24.86 mmol) was evaporated to a volume of ca. 8.0 mL. This concentrated solution was added to the hot reaction mixture in one portion, and the resulting solution was heated for 18 h under reflux (110° C.). The precipitate which formed on cooling the reaction mixture to room temperature was filtered off. Insoluble metallic Pd residues were removed from the precipitate by hot filtration from a refluxing $H_2O$ (30.0 mL) and ethanol (35.0 mL) mixture. Cooling of the hot filtrate to room temperature yielded, after filtration and drying, the product as yellow crystalline solid powder (2.38 g, 62.5% yield) identified as AVS having H NMR (500 MHz, $D_2O$): δ ppm=6.37 (d, J=15.86 Hz, 2H), 7.34 (d, J=15.80 Hz, 2H), 7.46-7.58 (m, 4H), 7.75-7.84 (m, 4H).

$SiO_2$—$F_{64}PcZn$ Light Reactions with AVS to Form $AVSO_2$.

Reaction progress via singlet oxygen oxidation can be monitored visually by the conversion of the intense yellow AVS into the colorless $AVSO_2$. The reaction can be followed by UV-vis spectroscopy via the disappearance of bands characteristic of anthracene at λ=360, 380, and 398 min and the appearance of four isobestic points at λ=231, 271, 332, and 430 nm. AVS (4.34 mg) was dissolved in 10.0 mL of $D_2O$ in a quartz photoreactor and the composite catalyst $SiO_2$—$F_{64}PcZn$ (50.0 mg) was added. The reaction mixture, kept at 25° C., under an 02 atmosphere was illuminated for 1.5 h with visible light, generated by a 300 W halogen projector lamp. The light was filtered by a sodium dichromate shield cutting off light produced below ~450 nm. $^1H$ NMR of $AVSO_2$ (500 MHz, $D_2O$) δ ppm: 6.95 (d, J=0.73 Hz, 1H), 6.98 (d, J=0.73 Hz, 1H), 7.46-7.51 (m, 4H), 7.55-7.60 (m, 4H), 7.72 (d, J=0.79 Hz, 1H), 7.75-7.77 (m, 1H).

Results

HPLC Analysis of AVS and $AVSO_2$.

Chromatography was performed on an Alliance Water 2695 HPLC with UV detector Water 2487 using a Zorbax CN150 mm, 4.6, 5 μm Agilent column. A 90%, 0.1M ammonium acetate, 10% methanol solvent system was used to elute the products at 1 mL/min. Sample size injected was 30 μL and the eluent was monitored at 220 and 250 nm. Singlet oxygen reaction of AVS to $AVSO_2$ was successful using $SiO_2$—$F_{64}PcZn$, oxygen and light in water.

The results of the AVS-$AVSO_2$ reaction using the $SiO_2$—$F_{64}PcZn$ materials were compared to a similar control oxidation reaction using Rose Bengal catalyst. The release of singlet oxygen and subsequent bleaching of Rose Bengal are well documented. The reaction of this model, water soluble photosensitizer was identical to the $SiO_2$—$F_{64}PcZn$ reaction, replacing only the fluorophthalocyanine with 0.194 mg Rose Bengal. The conversion of AVS to $AVSO_2$ was observed after only 7.3 minutes as detected by HPLC. No residual AVS was detected at the end of the reaction after 1.5 h had elapsed. All of the Rose Bengal was bleached, wherein the catalyst is unable to produce additional singlet oxygen, unlike the isolated $SiO_2$—$F_{64}PcZn$, which was capable of continuing singlet oxygen generation with additional exposure to light and oxygen.

As a control reaction to test for self-production of singlet oxygen by AVS, AVS was dissolved in $D_2O$ and the reaction proceeded as described above without the use of a photosensitizer. After 1 and 2 h of illuminations HPLC analysis showed 4.5 and 12% conversion to $AVSO_2$. In contrast, conversion reaches over 95% in the presence of $SiO_2$—$F_{64}PcZn$.

Example 2

Aniline was tested using the composite catalysts to determine conversion of a primary amine to nitro functional group.

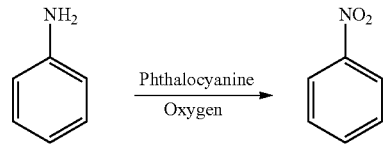 [SMILES: Nc1ccccc1 ; O=[N+]([O-])c1ccccc1]

Oxidation Reaction of Aniline to Nitrobenzene.

The reaction was performed in the same manner as the AVS-$AVSO_2$ reaction. Aniline was suspended in solvent and the fluorophthalocyanine was added unsupported ($F_{64}PcM$ alone) or as a composite catalyst. The reaction was run in an oxygenated environment with stirring and illuminated by a 300 W halogen bulb. A quartz photo-reactor immersion well was used.

The unsupported fluorophthalocyanine singlet oxygen catalyzed oxidation of aniline was unsuccessful. In a homogeneous solution, no significant nitrobenzene was observed after the reaction mixture was let reflux for 5 h with either a cobalt fluorophthalocyanine, $F_{64}PcCo$, in tetrahydrofuran, or a zinc fluorophthalocyanine, $F_{64}PcZn$, in ethanol. In both reactions, light below 450 nm was filtered.

Heterogeneous reactions using the fluorophthalocyanine composite catalysts did show success in synthesizing nitrobenzene. Both $SiO_2$—$F_{64}PcZn$ and $TiO_2$—$F_{64}PcZn$ respectively, were unable to oxidize aniline to nitrobenzene using filtered light. HPLC analysis shows only a trace unknown peak eluting at 6.7 minutes, just prior to an internal standard of nitrobenzene. However, when $TiO_2$—$F_{64}PcZn$ was exposed to unfiltered light, nitrobenzene was detected by HPLC at 0.78% after 3 hours of illumination and is visible as a shoulder in the product peak. The products were analyzed by liquid chromatograph-mass spectrometry, LCMS, and the nominal mass spectrum of the products observed in the 6.452-6.672 min retention time region corresponding to the product mixture shows a ES-API (+ve) peak of 123.1 corresponding to nitrobenzene.

In order to eliminate the possibility of aniline oxidation via singlet oxygen excited from $TiO_2$ upon exposure to ultraviolet light, a control experiment was conducted in which $TiO_2$ was employed in the reaction in the absence of fluorophthalocyanine. Aqueous reaction mixtures were extracted with ethyl acetate and the products analyzed by HPLC. Only 20% of nitrobenzene was evident by comparison to the $TiO_2$ supported fluorophthalocyanine indicating an active role of the fluorophthalocyanine when supported on $TiO_2$.

Example 3

Synthesis of $SiO_2$-Imi-$F_{64}PcZn$

Figure 3:
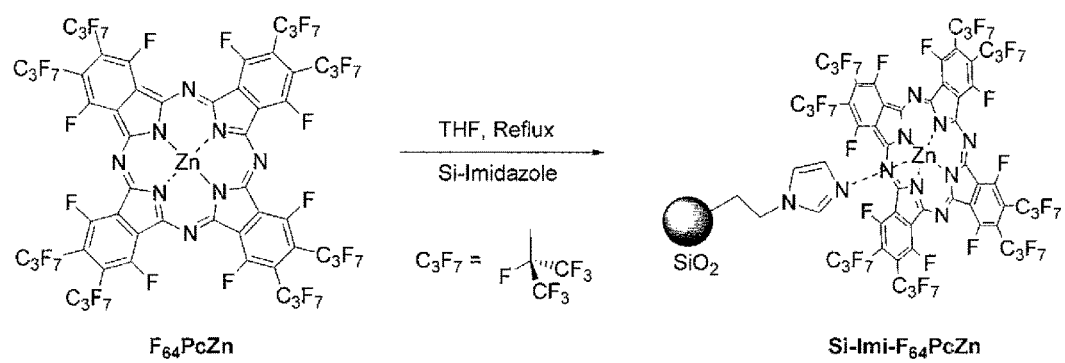
FIG. 3 is a schematic for the preparing $SiO_2$-Imi-$F_{64}$PcZn.
Figure 4:
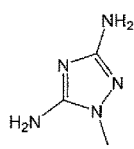
FIG. 4 is are molecular structures of energetic precursors showing amine groups.
Figure 4:
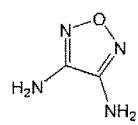
Figure 4:
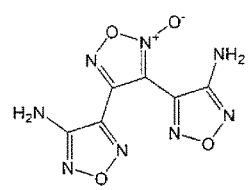

The process for preparing $SiO_2$-Imi-$F_{64}PcZn$ begins by dissolving 3.0 mg of $F_{64}PcZn$ in 10.0 mL THF and the solution was refluxed for 30.0 minutes. Thereafter, 200.0 mg of solid imidazole modified silica gel [Si-Imidazole] was added to the solution and the mixture was refluxed for another 30.0 minutes. The previously blue-green solution became colorless with green colored silica gel particles, suggesting that the phthalocyanine has migrated from solution to the support. The reaction mixture was filtered and washed with ethyl acetate (10.0 ml×3), noting that very little color was leached, possibly adventitious phthalocyanines. The last wash portion was colorless. The solid green colored silica gel particles were filtered and dried in oven at ~150° C. overnight. A schematic for preparing $SiO_2$-Imi-$F_{64}PcZn$ is illustrated in FIG. 3.

Leaching tests were performed as one of the methods to determine FPc stability and integrity in the reaction environment. The composite catalyst $SiO_2$-Imi-$F_{64}PcZn$ particles did not leached in organic solvents such as THF (Tetrahydrofuran), toluene, ethyl acetate, chloroform and dichloromethane (DCM), whereas phthalocyanine alone is soluble. On the other hand, leaching was observed for $SiO_2$-Imi-$F_{64}PcZn$ particles with strong polar solvents such as acetonitrile, methanol and ethanol. This may be attributable to the polar solvents competing with the imidazole for the metal site in the composite catalyst.

$SiO_2$-Imi-$F_{64}PcZn$ Light Reactions with AVS to Form $AVSO_2$.

AVS (10.85 mg) was dissolved in 25.0 mL of $D_2O$; 100.0 mg of $SiO_2$-Imi-$F_{64}PcZn$ was added and the reaction mixture was illuminated with a 300 W halogen projector lamp for 3 h under an oxygen balloon at 25° C. The light was filtered with a 0.01 M potassium chromate solution to allow only visible light to reach the reaction vessel. The progress of the reaction was monitored by UV-Vis spectroscopy and at the end by NMR. AVS was oxidized to $AVSO_2$.

The catalyst disclosed herein may be utilized for oxidation of amines to form oxidated nitrogen species in the synthesis of energetic materials from the starting materials 3,4-diaminofurazan (DAF), 3,4-bis(aminofurazano)furoxan (BAFF), and 1-methyl-3,5-diamino-1H-1,2,4-triazole (DAMT).

Although the subject invention has been described above in relation to embodiments thereof, it will be understood by those skilled in the art that variations and modifications can be effected in these preferred embodiments without departing from the scope and spirit of the invention.

What is claimed is:
1. A process for synthesizing energetics comprising:
   a. mixing a composite catalyst consisting essentially of a solid-state material in bonding contact with $F_xPcM$, wherein F is fluorine, Pc is phthalocyanine, M is a metal or non-metal covalently bonded to Pc and x is a number greater than zero, with an energetic precursor compound having at least one amine moiety in a solvent to form a reaction solution; and
   b. activating the composite catalyst by exposing said composite catalyst in the reaction solution to light and oxygen to produce at least one oxidized nitrogen moiety.
2. The process of claim 1 wherein the solid-state material is a metal oxide.
3. The metal oxide of claim 2 wherein said metal oxide is $TiO_2$ or $SiO_2$.
4. The process of claim 1, further comprising an axial ligand wherein said axial ligand connects the M group of the composite catalyst to the solid-state material.
5. The process of claim 4, wherein the axial ligand is an azole or diazine.
6. The axial ligand of claim 4, wherein said axial ligand is imidizole.
7. The composite catalyst of claim 1 wherein the $F_xPcM$ is $F_{64}PcZn$.
8. The process of claim 1 wherein the composite catalyst is insoluble in the solvent.
9. The process of claim 1, wherein the solvent is water.
10. The process of claim 1, further comprising removing the composite catalyst from the reaction solution by filtration after step b.
11. The process of claim 1, wherein the precursor compound is 3,4-diaminofurazan (DAF), 3,4-bis(aminofurazano)furoxan (BAFF), and 1-methyl-3,5-diamino-1H-1,2,4-triazole (DAMT).
12. A process for synthesizing energetics comprising:
   a. mixing a composite catalyst comprising metal oxide-$F_{64}PcZn$, with an energetic precursor compound having at least one amine moiety in water to form a reaction solution; and
   b. activating the composite material by exposing said composite catalyst to light and oxygen to produce at least one oxidized nitrogen moiety.

13. The process of claim 12 wherein the composite catalyst further comprises imidazole connecting the metal oxide and $F_{64}PcZn$.

14. The process of claim 12 wherein the energetic precursor is 3,4-diaminofurazan (DAF), 3,4-bis(aminofurazano)furoxan (BAFF), and 1-methyl-3,5-diamino-1H-1,2,4-triazole (DAMT).

* * * * *